UNITED STATES PATENT OFFICE.

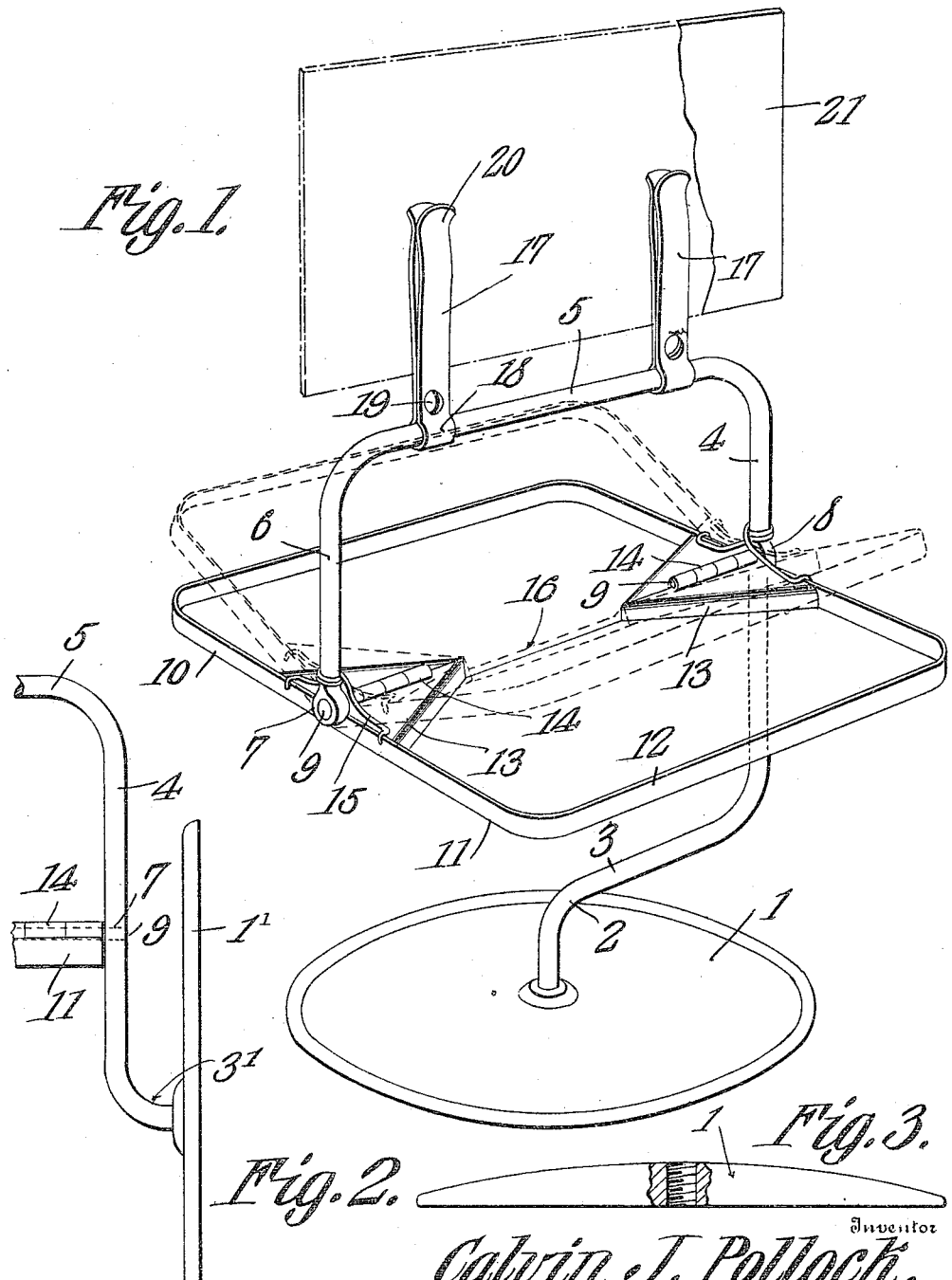

CALVIN J. POLLOCK, OF SEATTLE, WASHINGTON.

CHANGE-DELIVERY DEVICE.

964,549.  Specification of Letters Patent.  Patented July 19, 1910.

Application filed March 29, 1909. Serial No. 486,441.

*To all whom it may concern:*

Be it known that I, CALVIN J. POLLOCK, a citizen of the United States, residing at Seattle, in the county of King and State of Washington, have invented a new and useful Change-Delivery Device, of which the following is a specification.

This invention has reference to improvements in change delivery devices and is designed to provide a device adapted to receive change either from a customer or from a person giving change to a customer and from which the change may be readily received into the hand of the operator, while at the same time the device is adapted to receive and display advertising matter in a manner to readily attract attention and yet in no wise interfere with the operation of the device.

The invention will be best understood from a consideration of the following detail description taken in connection with the accompanying drawing forming a part of this specification in which drawing, Figure 1 is a perspective view of the change delivery device with an operative position of the device shown in dotted lines. Fig. 2 is an elevation of a portion of the device showing a modified form of support. Fig. 3 is an elevation of a base slightly differing from that shown in Fig. 1.

Referring to the drawings there is shown in Fig. 1 a base 1 which may be of circular or other shape and preferably is made heavy enough and also of sufficient area to properly support the device and prevent it from being overturned in ordinary use.

Rising from the base 1 is a post or standard 2 which if preferred may be made of a suitable rod or heavy wire bent first into a horizontal member 3 elevated a short distance above the base 1, and then bent into an upright or vertical portion 4 and again into a horizontal portion 5 forming a continuation of the portion 4 parallel with the portion 3 and overhanging the same and extending about equally on each side of a vertical line rising from the center of the base 1. The member 5 finally terminates in a downturned portion 6 of about half the length of the portion 4. The free end of the member 6 and the member 4 at about the middle point in its length is expanded and formed into eyes 7 and 8 respectively and secured in these eyes are pivot pins 9 extending one toward the other for a distance.

The pivot pins 9 form a support for a pan composed of two like wings 10 and 11 which together form a substantially square pan although it is to be understood that the invention is not limited to a pan of this particular shape. The wings 10 and 11 are formed with an exterior upwardly extending flange 12 and at the meeting edges these wings are formed with inwardly directed ledges 13 formed with hinge members 14 through which extend the respective pivot pins 9. The hinge members are formed on the upper surface of the ledges 13 so that when the wings are in the horizontal position the meeting edges abut. The ledges 13 are inclined toward the meeting edges of the two pans from the sides of the pans adjacent to the supporting frame members 4 and 6 and the ledges of each pan also approach each other along the meeting edges of the pan but terminate at a distance from the center thereof thus leaving the central portion of the pans where they meet free from obstruction. The normal weight of the wings of the pan is sufficient to hold the same in a horizontal position and this normal tendency may be supplemented by suitable springs 15.

With a structure such as described it is evident that change may be thrown upon the pan without any special effort being made to prevent the pieces of money from spilling off the pan since any tendency of the money to slide along the pan and off its edges is prevented by the upturned ledge or rim 12. In order to remove the money from the pan it is only necessary to insert the hand beneath the pan and with the fingers and thumb or the fingers and wrist to cause the outer edges of the pan wings to move upward thus constraining the coins to gravitate toward the meeting edges of the pan wings, which meeting edges because of the elevation of the hinge point above the top surface of the pan, will separate as the wings are folded upward thus producing an opening between the meeting edges of the pan as indicated in dotted lines at 16. The normal tendency of the coins will be to move along the upper surface of the wings when the latter are folded upward toward the opening 16 and fall through the same into the palm of the hand of the operator while any coins which may be toward the sides of the pan are directed toward this opening by the inclined walls of the ledges 13. Thus all coins are directed toward the opening 16 and ultimately fall therethrough into the hand of the operator. When the coins have left the upper surface of the pan and have been deposited in the palm of the hand of the operator then the operator may release the pan wings and the latter will move downward to their normal horizontal position ready to receive other coins and to hold the same until the pan wings are again folded upward to form the opening 16 between the meeting edges of these wings. The standard 2 with its continuing members serves to support the pan members at a sufficient elevation to permit the ready introduction of the hand of the operator beneath the pan without interference with the standard or its continuing members.

In the structure shown in Fig. 1 the change delivery device is shown as of a portable nature and may be placed at any point upon a counter or desk as the operator may desire. The change delivery device may however be made a fixture by continuing the member 4 laterally away from the said member as indicated at 3' in Fig. 2, and this lateral extension may be made fast to a plate 1' arranged to be fastened to a wall or the side of a desk or counter at any point desired.

The overhanging member 5 forms a convenient member for the attachment of advertisements and for this purpose there are provided clips 17 which may be each made of a strip of spring metal folded together with an eye 18 at the fold which eye is designed to grasp the member 5 and be clamped thereon by a suitable screw 19 passing through one member of the clip and into a nut in or beyond the other member. The free ends of the two legs of each clip 17 may be spread apart as indicated at 20 for the ready insertion of a card or placard 21 designed to contain advertising matter, or this card or placard may be replaced by any other type of advertisement which may be readily held by the clip 17. Since the change delivery device is used by all customers either to deposit the change or to receive the same after having made a purchase, attention is attracted by the advertising device 21 in a more prominent manner than though the advertisement were displayed at any other place.

The overhang 5 of the frame supporting the pan therefore not only provides a means for supporting the pan but at the same time serves as a means for the attachment of advertising matter and therefore performs a double function which is of particular value in connection with the change delivery mechanism.

It will be understood that the two wings of the pan are so related to the pivotal point that the impact of coins falling on said pan wings cannot cause the folding together of said pan wings, which folding together can only be caused by pressure exerted from below the pan wings as by the hand of the operator in the manner already described.

The base 1 may be made flat on one side and slightly rounded on the other side as shown in Fig. 3, and the post or standard 2 may be screwed into the base so that the latter may be reversed if desired. The wings of the pan and also the base may have advertising matter either printed or otherwise placed thereon and the advertising matter may be either permanent or removable or renewable. The pan wings may also be utilized for advertising purposes. The clips 17 may be shaped to either temporarily or permanently hold advertising matter.

What is claimed is:—

1. A change delivery device comprising a folding pan constrained in normal unfolded or extended condition, and a support for said pan extending from below the pan upward past one side of the pan, thence across the pan in the vertical plane of the meeting edges of the pan, and thence down and terminating at the other side of the pan, whereby there is provided free hand room immediately beneath the pan from all sides thereof except the one side occupied by the support.

2. In a coin delivery device, a folding pan having a normal tendency to remain in the unfolded position, and a support for the pan overhanging and engaging the latter at diametrically opposite points and extending below the pan and there provided with a supporting member, that portion of the support below the pan providing a free hand room immediately beneath said pan.

3. In a coin delivery device, a suitable base, a post or standard erected thereon and having a lateral member, an upright member forming a continuation of the lateral member, an overhanging member parallel with the lateral member and having an extension parallel with the upright member, pivot supports carried by the upright members and a change receiving pan composed of two members in normal abutment and supported at their abutting edges by the pivots.

4. A coin delivering device comprising a folding pan constrained to normal unfolded or extended condition, the support for said pan having an overhanging member to which the pan is secured at opposite ends, said support being extended beneath the pan in spaced relation thereto to a point substantially central to the pan and there provided with an extended base.

In testimony that I claim the foregoing as my own, I have hereto affixed my signature in the presence of two witnesses.

CALVIN J. POLLOCK.

Witnesses:
GRACE H. HANLEY,
WILLIAM B. BEBB.